United States Patent
Zhu et al.

(10) Patent No.: US 12,556,078 B2
(45) Date of Patent: Feb. 17, 2026

(54) VIBRATION EXCITER

(71) Applicant: AAC Microtech (Changzhou) Co., Ltd., Changzhou (CN)

(72) Inventors: Aijie Zhu, Shenzhen (CN); Zixu Hua, Shenzhen (CN); Jie Liu, Shenzhen (CN); Jiulong Hu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 333 days.

(21) Appl. No.: 18/091,348

(22) Filed: Dec. 29, 2022

(65) Prior Publication Data

US 2024/0088770 A1   Mar. 14, 2024

Related U.S. Application Data

(63) Continuation of application No. PCT/CN2022/120911, filed on Sep. 23, 2022.

(30) Foreign Application Priority Data

Sep. 9, 2022   (CN) .......................... 202222408397.0

(51) Int. Cl.
*H02K 33/06*   (2006.01)
*H02K 1/17*   (2006.01)
(Continued)

(52) U.S. Cl.
CPC ............... *H02K 33/06* (2013.01); *H02K 1/17* (2013.01); *H02K 1/34* (2013.01); *H02K 5/04* (2013.01)

(58) Field of Classification Search
CPC .. H02K 1/06; H02K 1/17; H02K 1/18; H02K 1/34; H02K 5/04; H02K 7/065;
(Continued)

(56) References Cited

U.S. PATENT DOCUMENTS

| | | | |
|---|---|---|---|
| 2011/0001384 A1* | 1/2011 | Segawa .................. | H02K 7/063 |
| | | | 310/195 |
| 2020/0044544 A1* | 2/2020 | Tang ...................... | H02K 33/16 |
| | (Continued) | | |

FOREIGN PATENT DOCUMENTS

| | | | | |
|---|---|---|---|---|
| JP | 2020141462 A | * | 9/2020 | ............. B06B 1/04 |
| KR | 20130031528 A | * | 3/2013 | ............. H02K 7/065 |
| WO | WO2020241355 A1 | * | 12/2020 | ............... H02K 1/34 |

OTHER PUBLICATIONS

JP2020141462A—Translation (Year: 2024).*

(Continued)

*Primary Examiner* — Christopher M Koehler
*Assistant Examiner* — Ahmed F Seck
(74) *Attorney, Agent, or Firm* — Wiersch Law Group

(57) ABSTRACT

The present disclosure discloses a vibration exciter comprising: a housing having a housing cavity, a stator assembly fixed in the housing, and a vibrator assembly housed in the housing cavity and driven to vibrate by the stator assembly; the stator assembly comprises a pole core fixedly attached to the inner side of the housing and a magnet fixedly attached to the side of the pole core that is back from the housing; the vibrator assembly includes a bracket housed in the housing cavity, a coil wound on the outside of the bracket, a counterweight fixed to the bracket, and a column assembly fixed to the end of the bracket and elastically connected to the housing; the bracket is a solid structure. When the coil is wound, it is wrapped around the bracket and column assembly, which is not easily deformed and improves the consistency of the coil shape.

9 Claims, 5 Drawing Sheets

(51) Int. Cl.
*H02K 1/34* (2006.01)
*H02K 5/04* (2006.01)

(58) Field of Classification Search
CPC ........ H02K 7/061; H02K 7/16; H02K 7/1876;
H02K 7/1892; H02K 23/02; H02K 33/06;
H02K 33/02; H02K 33/18; B06B 1/16;
B06B 1/04; B06B 1/045
USPC .............................. 310/36, 81, 32, 29, 12.31
See application file for complete search history.

(56) References Cited

U.S. PATENT DOCUMENTS

2020/0389078 A1* 12/2020 Takahashi .............. H02K 33/16
2022/0140718 A1* 5/2022 Chiba .................... H02K 33/12
310/28

OTHER PUBLICATIONS

KR20130031528A—Translation (Year: 2024).*
WO2020241355A1—Translation (Year: 2024).*
18091348_2025-06-03_KR_20130031528_A_H.pdf (Year: 2025).*

* cited by examiner

A-A

VIBRATION EXCITER

FIELD OF THE PRESENT DISCLOSURE

The present disclosure relates to the technical field of vibration exciter, especially relates to a vibration exciter.

DESCRIPTION OF RELATED ART

With the continuous development of science and technology, vibration exciter has gradually become an indispensable part of the electronic equipment, the current vibration exciter mainly includes the shell, magnet and coil. The coil is assembled in the vibration exciter to work with the magnet to cut the magnetic induction lines when the magnet vibrates to generate the induced electric potential that causes the coil and the counterweight fixed to it to vibrate up and down, providing vibration sensation.

The coils of the vibration exciter in the related technology are hollow wound, which are easily deformed during assembly and affect the consistency of the coil shape.

Therefore, it is necessary to provide a new vibration exciter to solve the above problems.

SUMMARY OF THE INVENTION

The present disclosure provide a vibration exciter capable of wrapping around a bracket and column assembly when coils are wound, which is less likely to deform and improves the consistency of the coil shape.

A vibration exciter comprising: a housing having a housing cavity, a stator assembly fixed in the housing, and a vibrator assembly housed in the housing cavity and driven to vibrate by the stator assembly; wherein, the stator assembly comprises a pole core fixedly attached to the inner side of the housing and a magnet fixedly attached to the side of the pole core that is back from the housing; the vibrator assembly includes a bracket housed in the housing cavity, a coil wound on the outside of the bracket, a counterweight fixed to the bracket, and a column assembly fixed to the end of the bracket and elastically connected to the housing; the bracket is a solid structure.

Further, the bracket includes a support portion located in the middle and two fixed portions attached to each end of the support portion, the fixed portions protrude from the outer surface of the support portion, and the two fixed portions form a spacing between them, the coil is wound on the support portion and is located within the spacing.

Further, a fixed portion is provided with a protruding assembly block on the outer side, and the vibration exciter also includes a flexible circuit board fixed to the assembly block and electrically connected to the coil, and the other end of the flexible circuit board leads out to the outer side of the housing.

Further, the column assembly includes a column fixedly connected to the fixed portion and resiliently connected to the housing, and a first positioning structure is provided at one end of the column, and a second positioning structure is provided at the fixed portion, and the first positioning structure and the second positioning structure are fixedly connected.

Further, the first positioning structure includes a riveted tab provided at one end of the column, the second positioning structure includes a riveted recess provided at the fixed portion, and the riveted tab is riveted to the riveted recess; and/or, the first positioning structure includes a riveted recess provided at one end of the column, and the second positioning structure includes a riveted; and/or, the first positioning structure includes an end face of the column, and the second positioning structure includes a slot provided on one side of the fixed portion, and the end face fits into the bottom of the slot and is secured by welding or bonding.

Further, the vibration exciter also includes a spring plate fixed to the end of the column away from the fixed portion, the edge of the spring plate being fixed to the housing.

Further, the spring plate includes a number of positioning holes, and the column is provided with a number of positioning bumps at one end away from the fixed portion, and the spring plate is connected to the column by the positioning holes and the positioning bumps; and/or, the spring plate includes a fixed hole, and the column is provided with a fixed recess at one end away from the fixed portion, and the vibration exciter also includes the bolt or rivet through the fixed hole and fixedly connected to the fixed recess; and/or, the spring plate and the column are fixed by welding or bonding.

Further, the vibration exciter also includes a counterweight set in the housing cavity and spaced from the housing, and the counterweight is provided with a perforation, and the column is embedded in the perforation and fixedly connected to the counterweight.

Further, the housing includes a case, a first cover plate fastened to one end of the case, and a second cover plate fastened to the other end of the case to jointly enclose a housing cavity; the first cover plate includes a positioning insert extending from its edge toward the case, and the case is provided with a positioning opening corresponding to the positioning insert.

Further, a flange is formed protruding from the inner side of the case toward the inside of the housing cavity, and an assembly slot is provided on the side of the flange back from the case for assembling the pole core.

Compared to related arts, by setting the bracket and column assembly, the coil in the present disclosure is wrapped around the bracket and column assembly when it is wound, which is not easy to deform, improves the consistency of the coil shape, and ensures the stability of the overall structure of the vibration exciter, and reduces the use of magnets, coils and other metal materials, saving production costs. The bracket and column assembly make the parts of the vibration exciter closely arranged and improve the space utilization.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
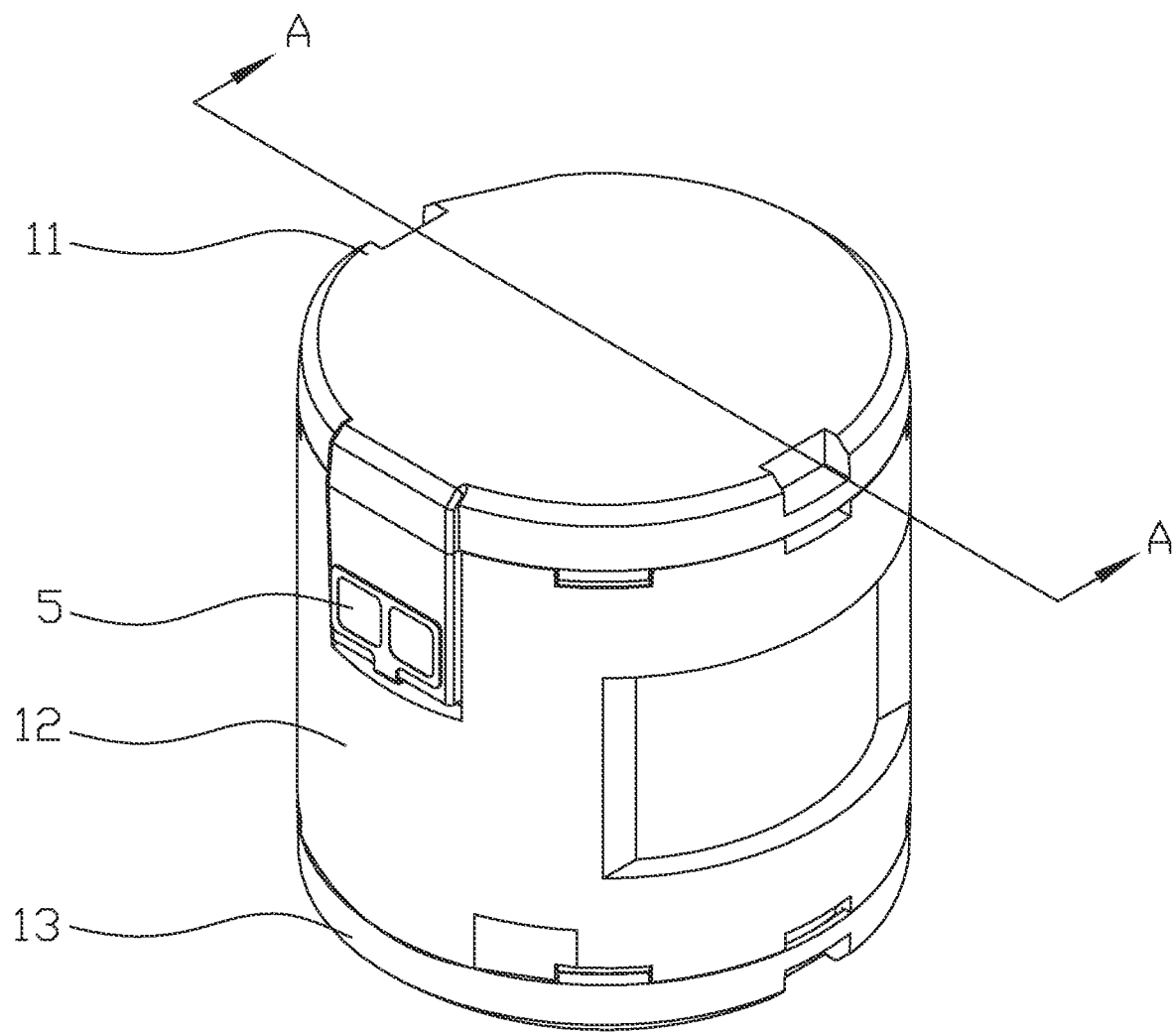
FIG. 1 is a structure schematic of a vibration exciter of the present disclosure.
Figure 2:
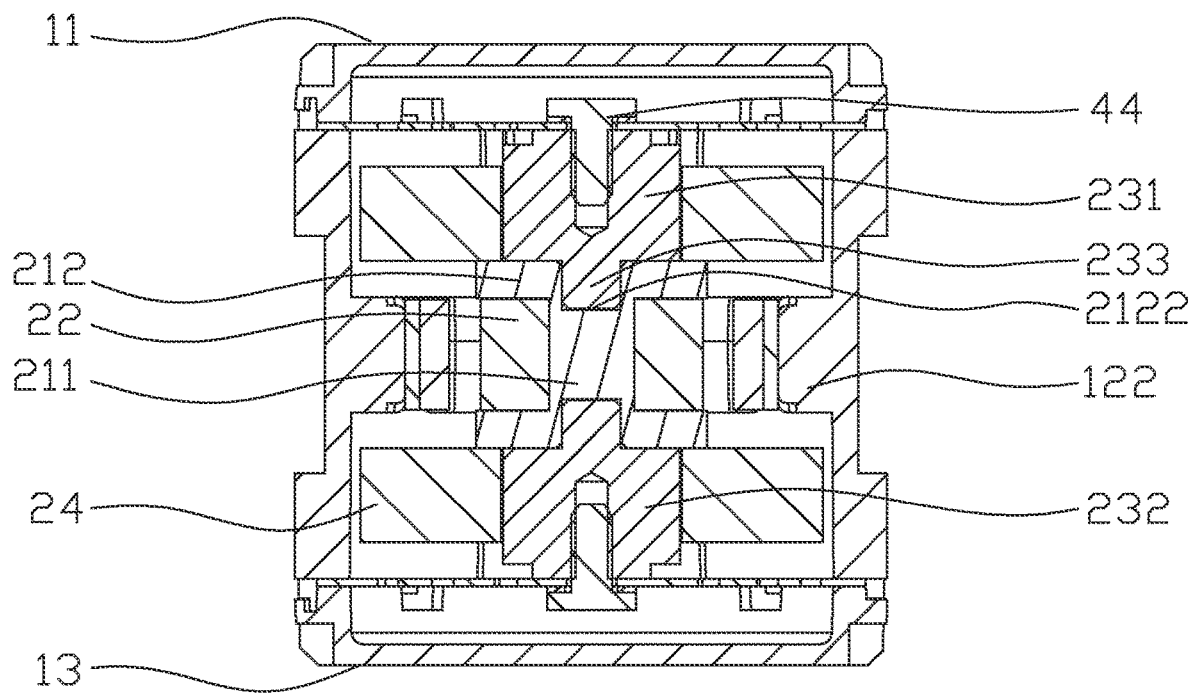
FIG. 2 is a cross-sectional view of the vibration exciter taken along line A-A in FIG. 1.

Please refer to FIGS. 1-2 together, a vibration exciter provided by an exemplary embodiment of the present disclosure includes a housing 1 having a housing cavity 14, a stator assembly 3 fixed in the housing 1, and a vibrator assembly 2 housed in the housing cavity 14 and driven to vibrate by the stator assembly 3. The stator assembly 3 comprises a pole core 31 fixedly attached to the inner side of the housing 1 and a magnet 32 fixedly attached to the side of the pole core 31 that is back from the housing 1. The vibrator assembly 2 includes a bracket 21 housed in the housing cavity 14, a coil 22 wound on the outside of the bracket 21, a counterweight 24 fixed to the bracket 21, and a column assembly 23 fixed to the end of the bracket 21 and elastically connected to the housing 1. The bracket 21 is a solid structure.

The vibration exciter of the present disclosure is generally widely used in cell phones, tablet PCs and other electronic products, in the case of receiving messages or incoming calls, etc., the electronic products will generate vibration according to the settings, set the vibration exciter in the electronic products to achieve the effect of vibration. By setting the bracket 21 and column assembly, when the coil 22 is wound, it is wrapped around the bracket 21 and column assembly 23, which is not easily deformed and improves the consistency of the shape of the coil 22 and ensures the stability of the overall structure of the vibration exciter, and at the same time makes the use of magnets 32, coil 22 and other metal materials reduced, saving production costs, and the bracket 21 and column assembly 23 make the parts of the vibration exciter closely arranged and improve the space utilization.

The bracket 21 includes a support portion 211 located in the middle and two fixed portions 212 attached to each end of the support portion 211, the fixed portions 212 protrude from the outer surface of the support portion 211, and the two fixed portions 212 form a spacing between them. The coil 22 is wound on the support portion 211 and is located within the spacing. In this embodiment, when the bracket 21 and the column are connected by rivets or bolts 44, the profile of the bracket 21 is "I" shaped, and the coil 22 works with the stator assembly 3 in the energized state to make the bracket 21 and the housing 1 vibrate together.

A fixed portion 212 is provided with a protruding assembly block 2121 on the outer side, and the vibration exciter also includes a flexible circuit board 5 fixed to the assembly block 2121 and electrically connected to the coil 22, and the other end of the flexible circuit board 5 leads out to the outer side of the housing 1.

Figure 3:
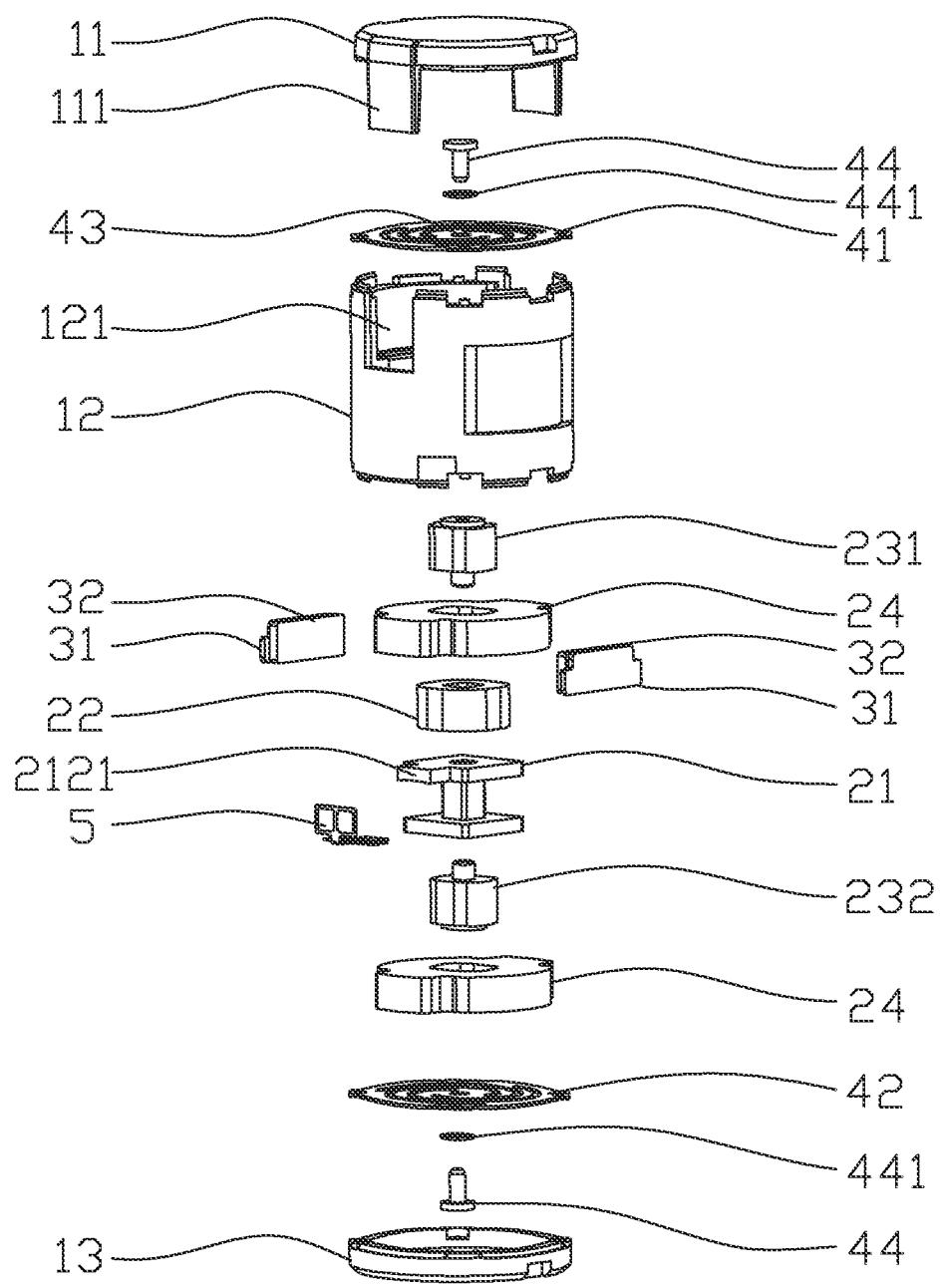
FIG. 3 is an exploded view of the vibration exciter of the present disclosure.

As shown in FIG. 3, the housing 1 includes a case 12, a first cover plate 11 fastened to one end of the case 12, and a second cover plate 13 fastened to the other end of the case 12 to jointly enclose a housing cavity 14; the first cover plate 11 includes a positioning insert 111 extending from its edge toward the case 12, and the case 12 is provided with a positioning opening 121 corresponding to the positioning insert 111. The shape of the positioning insert 111 is the same as the shape of the positioning opening 121, and the positioning insert 111 is inserted into the positioning opening 121 and fixed, but during the assembly process of the vibration exciter, the positioning insert 111 is not completely sealed with the positioning opening 121, and the length of the positioning insert 111 is shorter than the length of the positioning opening 121, leaving an assembly gap in the case 12 of the vibration exciter.

In this embodiment, the first cover plate 11, the second cover plate 13 and the case 12 are combined to form a barrel-shaped housing 1 structure, in addition, the housing 1 can use a metal material such as copper as the material of the housing 1, which can prevent magnetic leakage, prevent the magnetic field signal from flowing out, and guarantee the normal and effective operation of the vibration exciter.

The flexible circuit board 5 includes a first bending part and a second bending part, the first bending part is fixedly affixed to the assembly block 2121, and the second bending part extends to the outer side of the case 12 by bending through the assembly gap opened on the case 12. The first bending part and the second bending part produce the same bending angle as the space angle of the assembly block 2121 and the housing 1. The coil 22 is electrically connected to the flexible circuit board 5 when the coil 22 is wound on the bracket 21, and in addition, the vibration exciter is electrically connected to the outside through the flexible circuit board 5.

As shown in FIG. 1, in this embodiment, both the second cover plate 13 and the first cover plate 11 are combined with the case 12 in a snap-fit connection to form the housing 1, making the installation process of the vibration exciter more convenient and also easy to disassemble.

The column assembly 23 includes a column fixedly connected to the fixed portion 212 and resiliently connected to the housing 1, and a first positioning structure 233 is provided at one end of the column, and a second positioning structure 2122 is provided at the fixed portion 212, and the first positioning structure 233 and the second positioning structure 2122 are fixedly connected.

Figure 5:
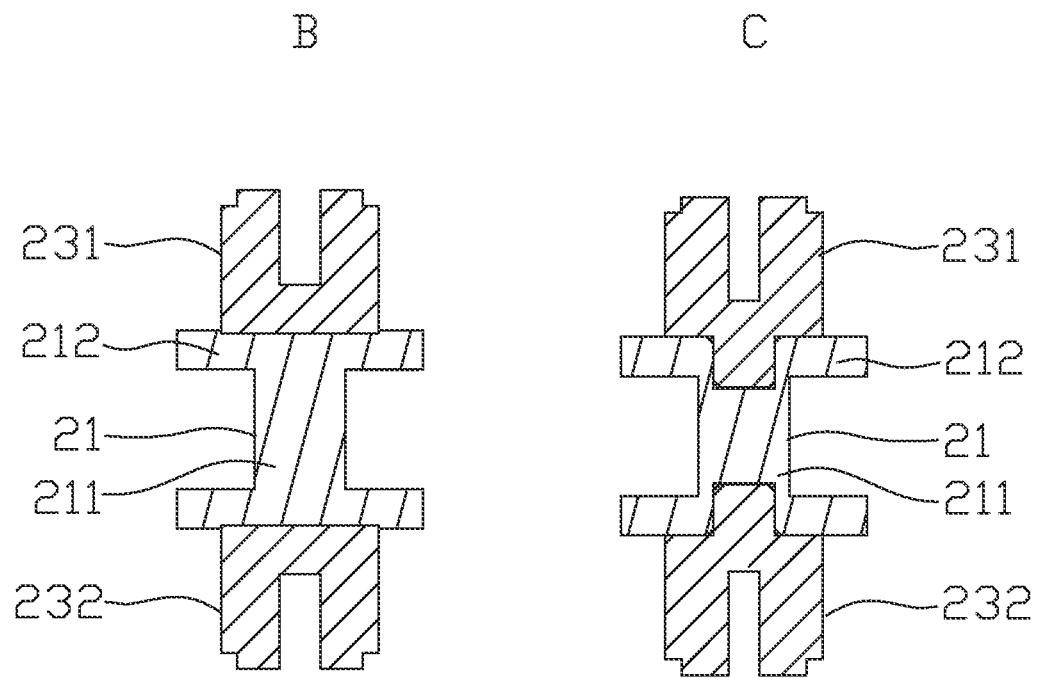
FIG. 5 is a structure schematic of the bracket and column assembly welded (B) or riveted (C) of the present disclosure.

Specifically, see FIG. 5C, the first positioning structure 233 includes a riveted tab provided at one end of the column, the second positioning structure 2122 includes a riveted recess provided at the fixed portion 212, and the riveted tab is riveted to the riveted recess; and/or, the first positioning structure 233 includes a riveted recess provided at one end of the column, and the second positioning structure 2122 includes a riveted; and/or, referring to FIG. 5B, the first positioning structure 233 includes an end face of the column, and the second positioning structure 2122 includes a slot provided on one side of the fixed portion 212, and the end face fits into the bottom of the slot and is secured by welding or bonding.

In this embodiment, the columns include the first column 231 and the second column 232, the first column 231 and the second column 232 are fixedly connected to the two fixed portions 212 of the bracket 21, the first column 231 and the second column 232 and the bracket 21 together support the coil 22 winding, while making the overall structure of the vibration exciter more stable. In some other embodiments, a group of columns or multiple groups of columns can be used to work together with the bracket 21, which is not limited here, as long as it can achieve stable support of the coil 22 and guarantee the normal operation of the vibration exciter. In addition, in other embodiments of this application, multiple coils 22 can be set up, and the corresponding number of brackets 21 and columns and other components can be set up accordingly.

The vibration exciter also includes a spring plate 4 fixed to the end of the column away from the fixed portion 212, the edge of the spring plate 4 being fixed to the housing 1.

Specifically, the spring plate 4 includes a number of positioning holes, and the column is provided with a number of positioning bumps at one end away from the fixed portion 212, and the spring plate 4 is connected to the column by the positioning holes and the positioning bumps; and/or, the spring plate 4 includes a fixed hole 43, and the column is provided with a fixed recess at one end away from the fixed portion 212, and the bolt 44 or rivet is inserted through the fixed hole 43 and into the fixed recess, and the vibration exciter also includes the bolt 44 or rivet through the fixed hole 43 and fixedly connected to the fixed recess; and/or, the spring plate 4 and the column are fixed by welding or bonding. In this embodiment, when the spring plate 4 is connected to the column by bolt 44 or rivet, a bolt spacer 441 is provided between the bolt and the column, respectively, to protect the spring plate 4 and the column structure, while increasing the contact area between the spring plate 4 and the column to improve the stability of the fixed connection, and the bolt spacer 441 can be made of rubber or metal of the same material as the bolt 44 or rivet.

In this embodiment, the spring plate 4 includes the first spring plate 41 and the second spring plate 42, which are fixedly connected to the ends of the two columns away from the fixed portion 212, respectively. The spring plate 4 is designed as a hollow spiral piece. On the one hand, when the spring sheet 4 and the column are fixedly connected by rivet connection or threaded connection, the rivet or bolt 44 can also be connected to the column through the central hollow part of the spring plate 4 without opening additional fixing holes 43, making the production process easier; on the other hand, the weight of the vibration exciter can be reduced, making the overall structure of the vibration exciter more lightweight. With the coil 22 energized, the stator assembly 3 drives the housing 1 to vibrate synchronously in the axial direction by means of the spring plate 4. In other embodiments of the present application, other types of resilient members can be used instead of the spring plate 4.

The vibration exciter also includes a counterweight 24 set in the housing cavity 14 and spaced from the case 12, and the counterweight 24 is provided with a perforation 241 for the column assembly 23 to pass through, and the column is embedded in the perforation 241 and fixedly connected to the counterweight 24. The counterweight 24 can be provided with a cylindrical shape that fits the case 12, while the counterweight 24 is provided with a recessed portion for easy assembly.

Specifically, the strength of the vibration can be controlled by setting the weight of the counterweight 24 according to different usage needs, and in addition, the counterweight 24 generally uses denser, for example, metal materials such as copper, tungsten or other alloys. The alternating current is generated by energizing the coil 22, which cuts the magnetic induction lines of the magnet 32 to produce the induced electric potential, causing the coil 22, the bracket 21 and the column assembly 23, and the two counterweight 24 fixedly connected to the bracket 21 and the column assembly 23 to produce up and down reciprocating vibration to provide vibration sensation.

Figure 4:
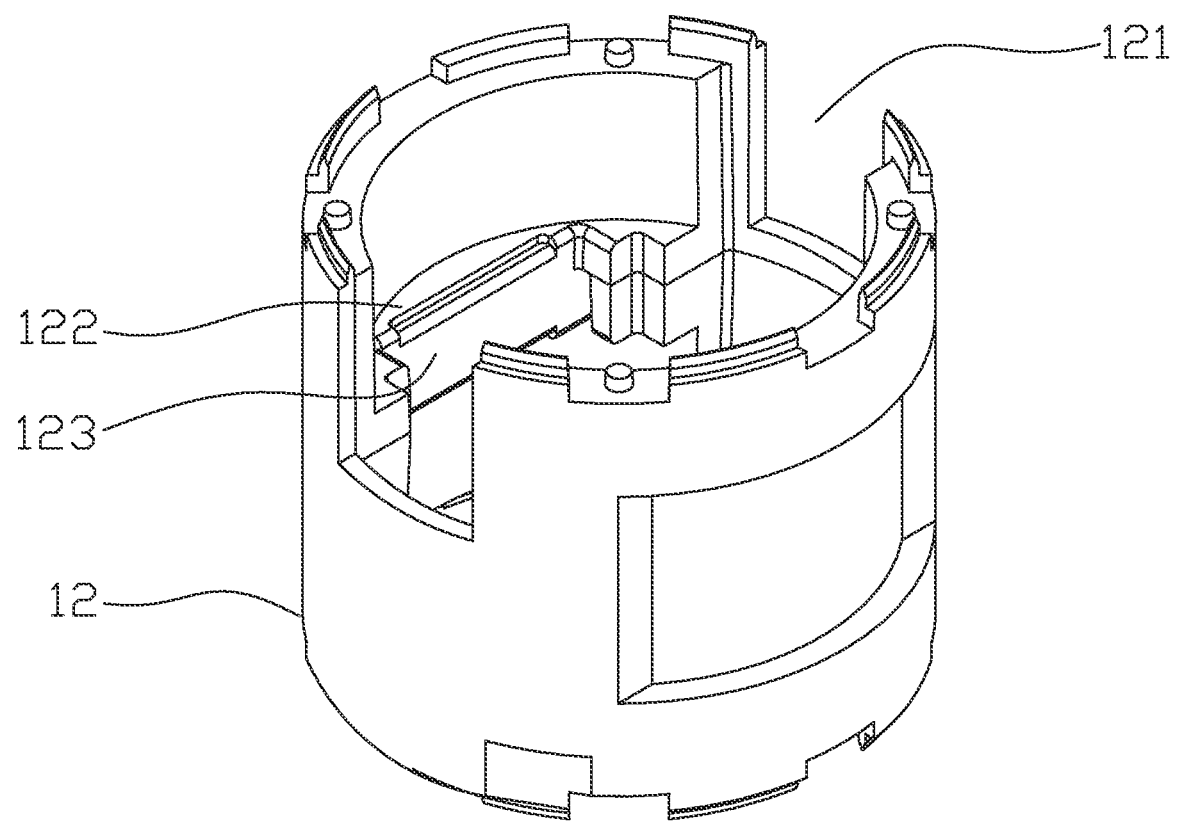
FIG. 4 is a structure schematic of a housing of the vibration exciter of the present disclosure.

Referring to FIG. 4, a flange 122 is formed protruding from the inner side of the case 12 toward the inside of the housing cavity 14, and an assembly slot 123 is provided on the side of said flange 122 back from said case 12 for assembling said pole core 31.

In this embodiment, two sets of stator assemblies 3 distributed on opposite sides of the walls in the housing cavity 14 are provided to produce higher magnetic field density and higher vibration efficiency. In this embodiment, one side of the pole core 31 and the magnet 32 are fixedly connected by bonding or welding, and the other side of the pole core 31 is fixedly connected by bonding or welding to the flange 122. When the pole core 31 and the magnet 32, and the pole core 31 and the flange 122 are fixed by means of bonding, magnetic adhesive can be used as a bonding tool to reduce the loss of magnetic media caused during vibration. The flange 122 also provides a certain amount of cushion space in the housing cavity 14 for the counterweight 24 when it vibrates.

In this embodiment, the counterweight 24 provides the amount of vibration for the vibration process, and the housing 1 is used to hold the stator assembly 3 as a way to ensure that the vibration system is subjected to a reciprocating driving force in the vertical direction. In addition, the two counterweights 24 produce the same direction and frequency of vibration.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration exciter comprising:
   a housing having a housing cavity, a stator assembly fixed in the housing, and a vibrator assembly housed in the housing cavity and driven to vibrate by the stator assembly;
   wherein, the stator assembly comprises a pole core fixedly attached to the inner side of the housing and a magnet fixedly attached to the side of the pole core that is back from the housing;
   the vibrator assembly includes a bracket housed in the housing cavity, a coil wound on the outside of the bracket, a counterweight fixed to the bracket, and a column assembly fixed to the end of the bracket and elastically connected to the housing; the bracket is a solid structure;
   the bracket includes a support portion located in the middle and two fixed portions attached to each end of the support portion, the fixed portions protrude from the outer surface of the support portion, and the two fixed portions form a spacing between them, the coil is wound on the support portion and is located within the spacing;
   the column assembly comprises a column, one end of the column being directly connected with one of the fixed portions.

2. The vibration exciter as described in claim 1, wherein a protruding assembly block is provided outside one of the fixed portions, and the vibration exciter also includes a flexible circuit board fixed at one end to the assembly block and electrically connected to the coil, and the other end of the flexible circuit board is leaded outside of the housing.

3. The vibration exciter as described in claim 1, wherein a first positioning structure is provided at one end of the column, and a second positioning structure is provided at the fixed portion, and the first positioning structure and the second positioning structure are fixedly connected.

4. The vibration exciter as described in claim 3, wherein the first positioning structure includes a riveted tab provided at one end of the column, the second positioning structure includes a riveted recess provided at the fixed portion, and the riveted tab is riveted to the riveted recess; and/or, the first positioning structure includes a riveted recess provided at one end of the column, and the second positioning structure includes a riveted; and/or, the first positioning structure includes an end face of the column, and the second positioning structure includes a slot provided on one side of the fixed portion, and the end face fits into the bottom of the slot and is secured by welding or bonding.

5. The vibration exciter as described in claim 3, wherein the vibration exciter also includes a spring plate fixed to the end of the column away from the fixed portion, the edge of the spring plate being fixed to the housing.

6. The vibration exciter as described in claim 5, wherein the spring plate includes a number of positioning holes, and the column is provided with a number of positioning bumps at one end away from the fixed portion, and the spring plate is connected to the column by the positioning holes and the positioning bumps; and/or, the spring plate includes a fixed hole, and the column is provided with a fixed recess at one end away from the fixed portion, and the vibration exciter also includes the bolt or rivet through the fixed hole and fixedly connected to the fixed recess; and/or, the spring plate and the column are fixed by welding or bonding.

7. The vibration exciter as described in claim 1, wherein the vibration exciter also includes a counterweight set in the housing cavity and spaced from the housing, and the counterweight is provided with a perforation, and the column is embedded in the perforation and fixedly connected to the counterweight.

8. The vibration exciter as described in claim 1, wherein the housing includes a case, a first cover plate fastened to one end of the case, and a second cover plate fastened to the other end of the case to jointly enclose a housing cavity; the first cover plate includes a positioning insert extending from its edge toward the case, and the case is provided with a positioning opening corresponding to the positioning insert.

9. The vibration exciter as described in claim 8, wherein a flange is formed protruding from the inner side of the case toward the inside of the housing cavity, and an assembly slot is provided on the side of the flange back from the case for assembling the pole core.

* * * * *